Feb. 4, 1958     H. P. VON KNAUF     2,821,947
FEEDING DEVICES FOR SOLDERING IRONS
Filed June 29, 1954
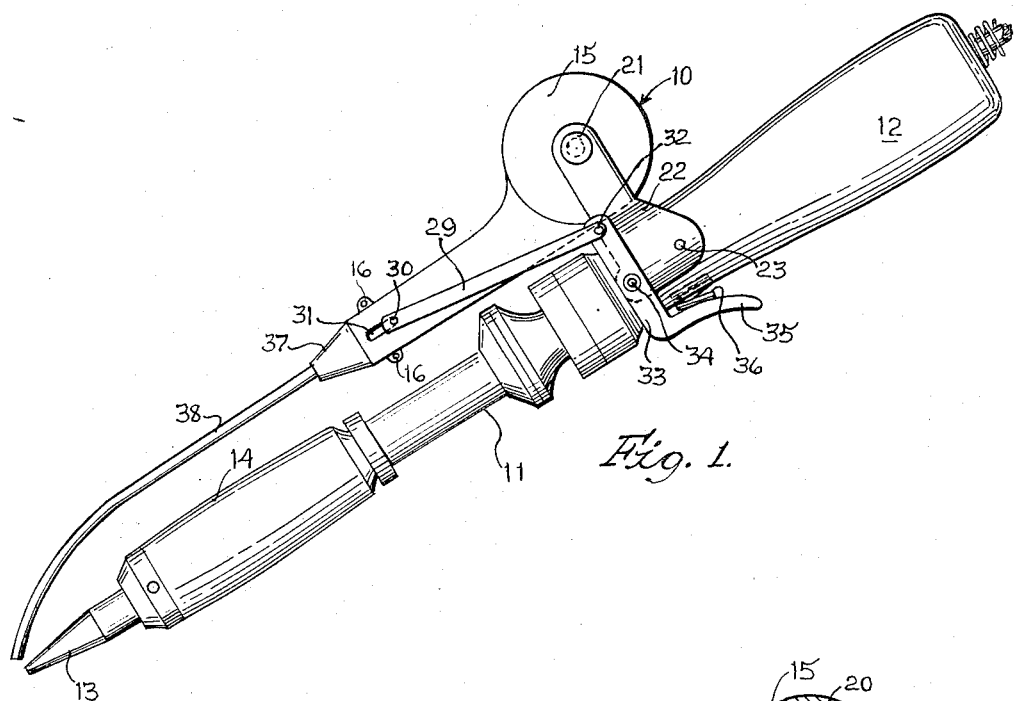
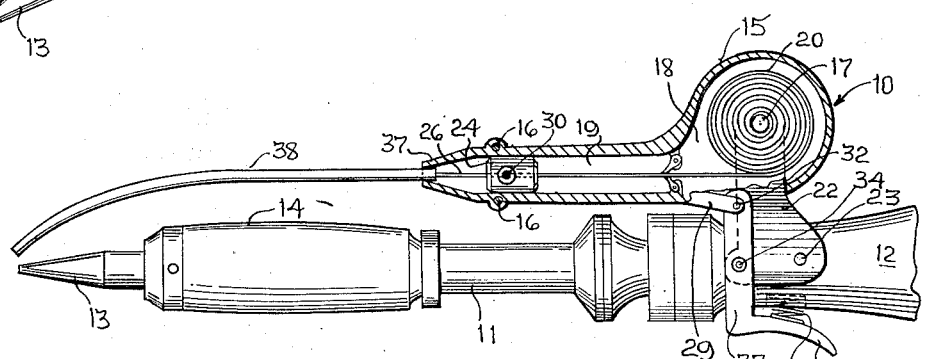
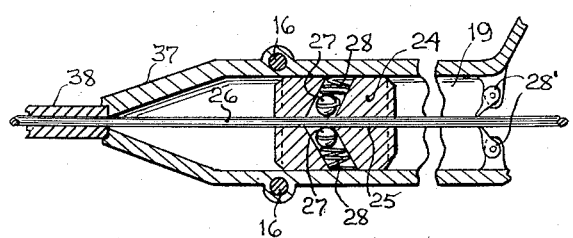
INVENTOR.
HARRY P. VON KNAUF
BY
HIS ATTORNEY.

United States Patent Office 2,821,947
Patented Feb. 4, 1958

2,821,947
FEEDING DEVICES FOR SOLDERING IRONS
Harry P. Von Knauf, Chicago, Ill.
Application June 29, 1954, Serial No. 440,011
1 Claim. (Cl. 113—109)

This invention relates to certain new and useful improvements in feeding devices for soldering irons and has for its principal object the provision of an improved construction of this character which will be highly efficient in use and economical in manufacture.

An important object of the invention is the provision of a feeding device which may be attached to a conventional soldering iron of the electrical type for feeding solder to the tip of the iron, thus enabling the operator to have free use of the hand which would ordinarily hold the solder for application to the work.

Other objects will appear hereinafter.

The invention consists in the novel combination and arrangement of parts to be hereinafter described and claimed.

The invention will be best understood by reference to the accompanying drawings showing the preferred form of construction, and in which:

Fig. 1 is a side elevational view of the invention;

Fig. 2 is a side elevational view of the invention shown partly in section;

Fig. 3 is an enlarged sectional detail view of the feeding tip of the invention.

The several objects of the invention are accomplished by the preferred form of construction shown in the accompanying drawings. In this connection, my improved feeding device is indicated geenrally at 10 and is adapted to be connected to a conventional soldering iron 11 having a handle 12 and a tip 13 heated to the proper degree by a heating element arranged within an enclosure 14.

My improved solder feeding mechanism comprises an enclosure 15 preferably consisting of two similarly formed confronting sections secured together by means of bolts 16 and 17 to provide a carriage chamber 18 and a cylinder or sleeve 19. The bolt 17 serves as a shaft supporting a roll of solder 20. One end of this shaft 17 is fixed as at 21 to a mounting bracket 22 in turn secured to the handle 12 of the soldering iron, as at 23. Within a sleeve 19 is arranged a chuck 24. This chuck 24 has a central longitudinal opening 25 through which a length of solder 26 is passed. Included as a part of the chuck structure 24 are ball grips 27 spring-held against the solder length so that when the chuck is moved in a forward direction, to the left as viewed in Fig. 2, the balls 27 by action of the springs 28, will grip the solder length 26 and move the same a predetermined distance.

To prevent movement of the solder length in a direction opposite to its feeding direction, I provide a pair of gravity-actuated pawls 28', one or both of which will bear on the solder length 26 to prevent the same from being moved backwardly relative to the sleeve 19 when the chuck is moved rearwardly for regripping action with respect to the length 26.

This chuck may vary in construction, the main and principal object being to feed the solder length 26 in one direction upon movement of the chuck a predetermined distance.

The movement of this chuck 24 is accomplished through the medium of an arm 29 pivoted to the chuck as at 30 with the pivot operating in an elongated slot 31 formed in the sleeve 19. The opposite end of this arm 29 is pivotally connected as at 32 to an L-shaped lever 33 pivoted to the mounting bracket as at 34. The limb 35 of the lever 33 provides a fingerpiece which may be engaged by the hand to effect pivoting of the lever 33 and in turn to impart movement to the chuck 24. The lever 33 is pivoted against the action of a spring 36 which normally returns the parts, including the chuck 24, to their normal initial starting position. The sleeve 19 provides a tapered nozzle 37 having connected thereto a tube 38 through which the solder length 26 is fed to a position closely adjacent the tip 13 of the iron 11.

A feeding mechanism constructed in accordance with the foregoing description may be sold either as an integral part or as a separate part of the electric iron and may be easily attached to the iron by a simple operation.

A soldering iron equipped with a feeding mechanism embodying the construction hereinbefore set forth will permit the operator free use of the hand which ordinarily was required to hold the length of solder during the soldering operation. A soldering iron equipped with a feeding mechanism of the construction hereinbefore set forth will be especially useful in soldering wire ends to tails or small electrical parts.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claim.

Having thus described my invention, what I claim as new and desire to protect by Letters Patent is:

A solder feeding device for an electric soldering iron including an enclosure attached to the handle portion of said iron, a chamber provided by said enclosure and a sleeve communicating with said chamber and extending in spaced apart substantially parallel relation with respect to said iron, a chuck reciprocable in the sleeve and having a longitudinal opening through which a length of solder from a roll arranged in the chamber passes, a chuck reciprocating means including an arm having one end connected to said chuck, an L-shaped lever having one end connected to the opposite end of the arm, a pivot pin pivotally connecting said lever to the handle portion of said iron with said lever providing a finger gripping portion, said chuck having diagonally extending lateral openings formed therein having open communication with the longitudinal opening, spring pressed ball grips in the diagonal openings and in engagement with said solder in said longitudinal opening, said ball grips movable in the diagonal direction of the lateral openings into binding engagement with said solder to move the same in one direction through said sleeve when said chuck is moved in one direction in said sleeve, and pivotable holding pawls in said sleeve extending in a parallel direction with respect to said diagonally extending openings of said chuck and engageable with the length of solder in the longitudinal opening to prevent movement thereof in an opposite direction when said chuck is moved in an opposite direction within said sleeve.

References Cited in the file of this patent

UNITED STATES PATENTS

| | | |
|---|---|---|
| Re. 21,991 | Walker | Dec. 30, 1941 |
| 1,851,420 | Carson | Mar. 29, 1932 |
| 1,951,441 | Rock | Mar. 20, 1934 |
| 2,093,527 | Petti | Sept. 21, 1937 |
| 2,251,557 | Weston | Aug. 5, 1941 |
| 2,396,799 | McCully | Mar. 19, 1946 |
| 2,454,875 | Hyde | Nov. 30, 1948 |
| 2,604,064 | Sefton | July 22, 1952 |

FOREIGN PATENTS

| | | |
|---|---|---|
| 638,043 | Germany | Nov. 9, 1936 |